३,६६६,४८८
METHOD FOR STABILIZING MEAT COLOR AND COMPOSITION THEREFOR
Yukihiro Nakao and Seishi Takagi, Osaka, and Hiromi Nakatani, Kyoto, Japan, assignors to Takeda Chemical Industries, Ltd., Osaka, Japan
No Drawing. Filed Feb. 25, 1970, Ser. No. 14,191
Claims priority, application Japan, Feb. 25, 1969, 44/14,134
Int. Cl. A22c *18/00;* A23b *1/00*
U.S. Cl. 99—107                                            4 Claims

ABSTRACT OF THE DISCLOSURE

The meat color developed by the conventional curing treatment of meat material with nitrates and/or nitrites is stabilized by the incorporation of (a) ascorbic acid and/or erythorbic acid and (b) isocitric acid into the meat material at a pH of 5 to 7, the weight ratio of the ingredient (b) to the ingredient (a) being 0.2 to 20. The meat products thus treated maintain their high quality even on exposure to light.

---

This invention relates to a method for stabilizing meat color in meat products. More particularly, the present invention is concerned with an improvement in stabilization of the meat color which is conventionally developed by the treatment with nitrates or nitrites during processing raw flesh into meat products.

Here, in the present specification, the term "meat products" is to be understood as encompassing both cured meat and processed meat products, as well as dressed meat which is used in the preparation of such foodstuffs. More particularly, the term is used to refer to any meat product which is based on the flesh derived from a mammal, fowl, fish or other animal and prepared with or without the addition of extraneous proteins, e.g. gluten, soybean protein, etc. Thus, ham, sausages, bacon, fishmeat ham, hamburg steak, etc. may be mentioned by way of example. It is also to be noted that the term "raw meat material" is used as the starting meat material to be processed into the meat products according to the present invention.

It is generally accepted that those meat products of good quality, whether based on animal meat, fish meat or other animal protein, have an attractive color along with adequate elasticity, good mouth feel and pleasing flavor.

In order to impart attractive shades of pink to the meat products, nitrates or nitrites (e.g. as the sodium or potassium salts) have been conventionally employed as color-developing agent (or simply "developer"). It has been known that the treatment of raw meat material with the nitrates or nitrites results in the formation of nitrosomyochromogen in the meat products, and the attractive meat color in the treated meat products is mainly attributable to the nitrosomyochromogen.

However, the nitrosomyochromogen is not very stable and particularly susceptible to light, so that the meat color once developed by said treatment is inclined to fade on further processing or storage.

In this regard, there have heretofore been used, known as color modifiers or fading retarders, such compounds as ascorbic acid or erythorbic acid (both whether in its free form or in such water-soluble, non-toxic salt form as sodium salts) or nicotinamide, to take advantage of the reducing or anti-oxidizing properties of those compounds. However, those agents are not as effective as might be desired. To make amends for the deficiency, the combined use of erythorbic acid and citric acid has been proposed (see, Food Engineering, vol. 37, No. 5, pp. 156–157 (1965)), but, as will be seen from Example 1 hereinafter given, the method does not offer satisfactory effect and cannot be exploited to advantage.

It has now been found by the present inventors that the combined use of isocitric acid with ascorbic acid and/or erythorbic acid yields an excellent effect easily so that the color quality of meat products is significantly improved, and that the improved quality is attributable to a synergistic effect of the combined ingredients in stabilizing the meat color which has been developed by the treatment with the nitrates or nitrites.

It is therefore the principal object of the present invention to provide a method for stabilizing the meat color developed by the conventional treatment with nitrates or nitrites, whereby a superior quality of the meat products is attained.

Another object of the invention is to provide meat products of superior qualities, exhibiting an attractive color which is intrinsic in a high grade meat product and which is long-standing on processing or storage, even on exposure to light.

It is a further object of the present invention to provide a composition which is an excellent fading retarder or modifier in processing raw meat material into meat products, and which is made up for ready and convenient use in meat industries.

The first two objects are realized by bringing raw meat material into an intimate contact with a weakly acid aqueous solution comprising (a) ascorbic acid and/or erythorbic acid and (b) isocitric acid, until an effective amount of the isocitric acid is incorporated into the meat material.

The aforesaid isocitric acid may be whether its free form or a salt thereof. As for said salt, it may be any of the mono-, di- or tri-salts as far as they are water-soluble and non-toxic, and may for example be the salt with sodium, potassium, ammonium, magnesium or calcium. Furthermore, those salts and the free acid may be used in combination.

Ascorbic acid and erythorbic acid, which are used as the ingredient (a) in conjunction with said isocitric acid, may also be either their free forms or in the form of salts. Regarding the salts, the sodium salts which are officially approved food additives in Japan and currently used commonly in meat products can be mentioned as typical examples, although other non-toxic water-soluble salts such as the salts with potassium, ammonium, magnesium, calcium, etc. may also be employed. It goes without saying that, aside from the salts particularly mentioned above, any other salts may be employed as well only if they are instrumental to the attainment of the object of the present invention. Here again, ascorbic acid, erythorbic acid and their salts may be used either singly or in combination.

Said contact is practically to be carried out at a pH of about 5 to 7 so as to avoid possible denaturation of meat material. For example, when use is made of the free form of isocitric acid, ascorbic acid or erythrobic acid, it may happen that the pH of the aqueous medium surrounding the meat material shifts to the acidic side to detract its water retention and binding qualities. It is therefore generally recommended to adjust the aqueous solution comprising both ingredients (a) and (b) to a pH of said practical range, preferably a pH from 5.7 to 6.3, before the intimate contact is achieved. The adjustment can be properly made with a non-toxic mineral acid such as hydrochloric acid or phosphoric acid, or with an alkali such as sodium hydroxide, sodium hydrogencarbonate, potassium carbonate, alkali polyphosphates or the like.

The incorporation of isocitric acid along with ascorbic acid and/or erythorbic acid into the raw meat material may be effected in the per se known manner prior to or at the same time or after the conventional curing treatment with the nitrates or nitrites. Thus, it is sufficient to incorporate and disperse evenly as possible the isocitric acid along with at least one of said ascorbic acid and erythorbic acid compounds into the raw meat material at an opportune time for the attainment of the object of the invention in the course of the processing of meat.

For instance, those compounds may be added in liquid or particulate form to the raw meat material in the making, by any of such known to techniques as blending, kneading, dipping, installation, spraying, injection, impregnation, embrocation, coating, etc., the choice of any particular technique depending upon the type of the raw meat material, the form of substrate, the processing means being used. All that is required is to ensure that the additives will finally be evenly dispersed in the aqueous medium surrounding that meat material and be incorporated into the meat material.

The aforesaid additives may be added to the raw meat material while the latter is still in the form of raw flesh, or at a suitable stage in the production process, e.g. in the course of curing or mixing. Thus, for example, in case of animal meat ham, sausage and bacon, the additives according to this invention may be incorporated into raw meat material by any of the conventional means of incorporating curing modifiers at the curing stage, that is to say, by injection, pickling or embrocation. As for the types of meat products which are not subjected to color development in the curing step, the additives may be incorporated into the meat emulsion at the mixing stage by any of the conventional means of adding anti-oxidizing agent or others.

The proportion of the isocitric acid to be thus contacted may range from 0.2 to 20 times by weight the amount of ascorbic acid and/or erythorbic acid in terms of the respective free acids, and the effective amount of the same to be incorporated ranges from about 0.01 to about 0.5 percent by weigth, preferably about 0.05 to 0.15 percent by weight, relative to the weight of the raw meat material or meat emulsion.

While the conventional practice is such that ascorbic acid or erythorbic acid is added in the standard amount of about 0.05 percent, the standard amount is increased or decreased depending upon the substrate materials, processing means or other factors. For instance, in the case of fish meat sausages, a comparatively small amount of ascorbic or erythorbic acid is added and the proportion of such acid may sometimes be as low as about 1/30,000 to 1/50,000 based on the weight of the finished meat emulsion. Even in such cases, isocitric acid is added within the range of about 0.2 to 20 times by weight the amount of the ascorbic acid or erythorbic acid.

While nicotinamide or other color modifiers may of course be further employed as well within the scope of the invention, the additives according to the invention may be suitably compounded with a suitable food additives such as various vehicles, dispersing agents, solvents, etc. or other naturally-occurring products. The said additive such as various vehicles, dispersing agents, solvents, bonate, sorbitol, glycerol, propylene glycol, various phosphates, sucrose, glucose, table salt, sodium glutamate, fatty acid glycerides, sugar fatty acid esters, propylene glycol fatty acid esters and other surface active agents.

For the practical purpose, it is convenient to prepare, in advance to carrying out the method of this invention, a premix composition which comprises, as the effective ingredients in admixture with a carrier, said ingredients (a) and (b) in the above-specified weight ratio, and which exhibits a pH of about 5 to 7 when dissolved in water at a concentration of 10% weight/volume. Such a premix is readily used for the method of the present invention. For example, it may directly be blended or kneaded into, or embrocated or coated on, the raw meat material; while it may directly be dissolved in a suitable solvent such as water, optionally with other proper ingredients as mentioned above, and then the solution is used for said contact of the raw meat material with the effective ingredients. It is to be understood that any of the above-mentioned additives and other color modifiers as well as the nitrates and nitrites can be employed as constituting the carrier of the premix composition. The premix composition which comprises the color-developing agent such as the nitrates and/or nitrites is conveniently employed for carrying out the method of this invention along with the curing treatment of the meat material. The carrier per se is to be dispersible in water so as to make the whole premix dispersible and in view of the stability, its constituents are desirably selected from those of solids.

The present invention is thus very instrumental to the industry, for the combined use of isocitric acid with ascorbic or erythorbic acid yields a synergistic effect, that is, enhances the desirable color quality of meat products, by acting as particularly excellent fading retarder, and the method can be easily carried into practice positively and economically without modifying in any manner the conventional sequence of operations.

The following examples as well as those of premix compositions are given to further illustrate the invention. In these examples, all percentages are on the weight basis unless otherwise noted, and the abbreviations "cm.," "mm.," "mμ," "g.," "ml." and "%" mean "centimeter(s)," "millimeter(s)," "millimicron(s)," "gram(s)," "milliliter(s)" and "percent," respectively.

EXAMPLE 1

Mutton lean meat is minced well in the conventional manner, followed by the addition of 0.02% of sodium nitrate and 2.5% of sodium chloride thereto, along with the various additives of Table 1. The resulting meat formulations are adjusted to pH 6.0 with hydrochloric acid or sodium hydroxide and, then cured at 5° C. for 3 days. The cured meat formulations are heated at about 80° C. for 50 minutes to prepare samples. Comparison of those samples is summarized in Table 1, which clearly demonstrates the effectiveness of the method of the present invention.

Comparative test: (Accelerated fading test)

Each of the meat samples was cut into about 3 mm. thick slices which were then irradiated on both sides for 40 minutes each, using 100 watt white-light fluorescent lamps positioned at the distance of 25 cm.

To 10 g. of each of the samples were added 3 ml. of water and 40 ml. of acetone, and after an extraction time of 20 minutes, the mixture was filtered, followed by the addition of 0.5 ml. of concentrated hydrochloric acid to the filtrate and, then, of 1 ml. of trichloroethylene. Finally, the mixture was made up to 50 ml. with 80% aqueous acetone. The nitroso pigment (nitrosomyochromogen) extracted from each meat sample was determined by measuring the absorbance at the wavelength of 540 mμ of the resulting preparation. The result is shown in Table 1. The higher the absorbance value, the more intensive is the reddish color that will be developed on pickling and heating, and the more instrumental is the particular additive to the attainment of the object of the invention.

TABLE 1

| Additive(s), percent | Absorbance Immediately after preparation (A) | Absorbance Immediately after irradiation (B) | Fading ratio, percent $\left(\frac{(A)-(B)}{(A)} \times 100\right)$ |
|---|---|---|---|
| None (control) | 0.426 | 0.216 | 49.3 |
| Monopotassium isocitrate, 0.15 | 0.435 | 0.256 | 41.2 |
| Sodium erythorbate, 0.15 | 0.430 | 0.280 | 34.9 |
| Potassium citrate, 0.15 / Sodium erythorbate, 0.05 | 0.435 | 0.290 | 33.3 |
| Monopotassium isocitrate, 0.15 / Sodium erythorbate, 0.05 | 0.446 | 0.413 | 7.4 |

EXAMPLE 2

Recipe

| | Percent |
|---|---|
| Pork | 12 |
| Mutton | 30 |
| Horsemeat | 10 |
| Lard | 15 |
| Potato starch | 5 |
| Table salt | 2.3 |
| Ice water | 25 |
| Sodium nitrite | 0.05 |
| Polyphosphate mixture (sodium tripolyphosphate: sodium hydrogen pyrophosphate=2:1) | 0.3 |
| Smoke flavor powder | 0.2 |
| Spices | 0.15 |

I.e.:

| | Percent |
|---|---|
| White pepper | 0.05 |
| Ginger (dried soluble) | 0.015 |
| Nutmeg (dried soluble) | 0.06 |
| All spice (dried soluble) | 0.015 |
| Cardamon (dried soluble) | 0.01 |

In the above recipe, pork, mutton and horsemeat were previously minced and mixed in the conventional manner. To the mixed meat, the auxiliary ingredients, i.e. lard, ice water, etc., are added and the entire mixture was cut in a silent cutter for 5 minutes. The resulting mixture was divided into five portions, which were evenly admixed with the additives of Table 2. After the mixtures were adjusted to pH 6.0 with hydrochloric acid or sodium hydroxide, they were dispensed into polyvinylidene chloride casings and the resulting encased samples were heated at about 80° C. for 50 minutes to prepare sample sausages.

Each of the above samples was subjected to the accelerated fading test in the same manner as described in Example 1, to give the result as shown in Table 2.

A panel of 20 expert judges were instructed to compare and evaluate the color of the samples. The unanimous judgment in favor of the plot for the combined use of the isocitric acid and sodium ascorbate over the other plots was indicative of the effectiveness of the method of the present invention.

TABLE 2

| Additive(s), percent | Absorbance at 540 mμ Immediately after preparation (A) | Absorbance at 540 mμ Immediately after irradiation (B) | Fading ratio, percent $\left(\frac{(A)-(B)}{(A)} \times 100\right)$ |
|---|---|---|---|
| None (control) | 0.260 | 0.080 | 69.2 |
| Isocitric acid, 0.10 | 0.265 | 0.100 | 62.3 |
| Sodium ascorbate, 0.05 | 0.267 | 0.128 | 52.1 |
| Citric acid, 0.10 / Sodium ascorbate, 0.05 | 0.265 | 0.130 | 50.9 |
| Isocitric acid, 0.10 / Sodium ascorbate, 0.05 | 0.280 | 0.255 | 8.9 |

Premix composition 1

| | Percent |
|---|---|
| Monopotassium isocitrate | 30 |
| Sodium erythorbate (or sodium ascorbate) | 10 |
| Dextrin | 30 |
| Sodium tripolyphosphate | 30 |

This composition is used in an amount of about 0.5% relative to the raw meat material to be treated.

Premix composition 2

| | Percent |
|---|---|
| Sodium nitrate | 1.0 |
| Sodium nitrite | 1.2 |
| Sodium tripolyphosphate | 20.0 |
| Sodium hydrogen pyrophosphate | 10.0 |
| Sodium erythorbate | 3.0 |
| Monopotassium isocitrate | 7.0 |
| Table salt | 10.0 |
| Dextrin | 39.8 |
| Smoke flavor powder | 2.0 |
| Hydrolized vegetable protein | 2.8 |
| Monosodium glutamate | 2.0 |
| Disodium 5'-inosinate | 0.1 |
| Disodium 5'-guanylate | 0.1 |
| White pepper | 0.5 |
| Nutmeg (dried soluble) | 0.25 |
| Ginger (dried soluble) | 0.1 |
| Mace (dried soluble) | 0.1 |
| Allspice (dried soluble) | 0.05 |

A 10% (weight/volume) aqueous solution of this composition exhibits pH 6.1. This composition fits for the treatment of the raw meat material along with the curing treatment in one process. The proper amount is about 1.5 to 2.0% relative to the raw meat material to be treated.

What is claimed is:

1. A method for stabilizing the meat color developed in meat products by the treatment with nitrates or nitrites, which comprises bringing raw meat material into an intimate contact with a weakly acid aqueous solution having a pH of about 5 to 7 of a composition comprising (a) ascorbic acid and/or erythorbic acid and (b) isocitric acid, the weight ratio of the ingredient (b) to the ingredient (a) being about 0.2 to 20 in terms of the respective free acids, until about 0.01 to 0.5 percent by weight of the isocitric acid in terms of the free acid relative to the weight of the raw meat material is incorporated into the meat material.

2. The method according to claim 1, wherein the ingredients (a) and (b) are in the respective alkali metal salt form.

3. A premix composition for stabilizing the meat color developed in meat products by the treatment with nitrates or nitrites, which comprises, as active ingredients in admixture with a per se dispersible carrier, (a) a member selected from the group consisting of free ascorbic acid, free erythorbic acid, their water-soluble non-toxic salts and a mixture thereof and (b) a member selected from the group consisting of free isocitric acid, its water soluble non-toxic salts and a mixture thereof, the weight ratio of the ingredient (b) to the ingredient (a) being about 0.2 to 20 in terms of the respective free acids; and which exhibits a pH of about 5 to 7 when dissolved in water at a concentration of 10% weight/volume.

4. The premix composition according to claim 3, wherein the ingredients (a) and (b) are in the form respective alkali metal salts.

References Cited

UNITED STATES PATENTS 3,154,421 10/1964 Voegeli et al. _____ 99—159
3,477,859 11/1969 Brown et al. _____ 99—159

HYMAN LORD, Primary Examiner

U.S. Cl. X.R.

99—108, 109, 157, 159, 222, 224